US 8,417,266 B2

(12) United States Patent
Kim et al.

(10) Patent No.: US 8,417,266 B2
(45) Date of Patent: Apr. 9, 2013

(54) LOCATION BASED SERVICE SYSTEM

(75) Inventors: Joo-Young Kim, Suwon-si (KR); Wuk Kim, Gwacheon-si (KR)

(73) Assignee: Samsung Electronics Co., Ltd (KR)

( * ) Notice: Subject to any disclaimer, the term of this patent is extended or adjusted under 35 U.S.C. 154(b) by 750 days.

(21) Appl. No.: 11/523,277

(22) Filed: Sep. 18, 2006

(65) Prior Publication Data
US 2010/0267398 A1 Oct. 21, 2010

(30) Foreign Application Priority Data
Sep. 16, 2005 (KR) .................... 10-2005-0086938

(51) Int. Cl.
*H04W 24/00* (2009.01)
(52) U.S. Cl. .................... 455/457; 455/404.2; 455/411; 455/456.1; 455/456.2; 455/456.3
(58) Field of Classification Search ................ 455/456.1
See application file for complete search history.

(56) References Cited

U.S. PATENT DOCUMENTS

| 5,946,626 | A * | 8/1999 | Foladare et al. ............ 455/456.1 |
| 6,952,181 | B2 * | 10/2005 | Karr et al. .................... 342/457 |
| 7,330,728 | B1 * | 2/2008 | Moll et al. ................. 455/456.3 |
| 7,403,972 | B1 * | 7/2008 | Lau et al. ..................... 709/206 |
| 7,428,571 | B2 | 9/2008 | Ichimura |
| 2004/0166832 | A1 * | 8/2004 | Portman et al. ............ 455/412.1 |
| 2004/0208304 | A1 * | 10/2004 | Miller ...................... 379/210.02 |
| 2005/0143097 | A1 * | 6/2005 | Wilson et al. .............. 455/456.3 |
| 2006/0166648 | A1 * | 7/2006 | Roach, Jr. ..................... 455/411 |
| 2006/0205416 | A1 * | 9/2006 | Kayzar et al. .............. 455/456.1 |
| 2008/0147798 | A1 * | 6/2008 | Paalasmaa et al. ........... 709/204 |

FOREIGN PATENT DOCUMENTS

| JP | 11-051678 | 2/1999 |
| KR | 1020030081171 | 10/2003 |
| KR | 1020050027332 | 3/2005 |

OTHER PUBLICATIONS

Open Mobile Alliance, OMA-AD-SUPL-V1_0-20041101-D, Secure User Plane Location Architecture, Draft Version 1.0, Nov. 1, 2004.
Open Mobile Alliance, OMA-AD-SUPL-V1_0-20050419-D, Secure User Plane Location Architecture, Draft Version 1.0, Apr. 19, 2005.

* cited by examiner

*Primary Examiner* — Dai A Phuong
(74) *Attorney, Agent, or Firm* — The Farrell Law Firm, P.C.

(57) ABSTRACT

Disclosed is a Location Based Service (LBS) system for providing location information of a target terminal for positioning. Such a LBS system can provide both a requester for location information as well as a third party specified by the requester with the location information by means of only one request message for the location information. The LBS system includes a requester terminal requesting location information of a specific terminal, and a LBS provider receiving a request for the location information from the requester terminal and providing the requester terminal with the location information. The LBS provider receives information on at least one terminal specified to simultaneously receive the location information, along with the request message for the location information, from the requester terminal, whereby the LBS provider delivers the location information to the at least one specified terminal along with the requester terminal.

23 Claims, 3 Drawing Sheets

LOCATION BASED SERVICE SYSTEM

PRIORITY

This application claims priority to an application entitled "Location Based Service System" filed in the Korean Intellectual Property Office on Sep. 15, 2005 and assigned Ser. No. 2005-86938, the contents of which are incorporated herein by reference.

BACKGROUND OF THE INVENTION

1. Field of the Invention

The present invention relates generally to a Location Based Service (LBS) system utilizing terminals, and in particular, to a LBS system for providing location information of a target terminal for positioning.

2. Description of the Related Art

In conventional LBS systems, when one of a child's parents requests location information of his/her child to a LBS provider, the LBS provider does not provide the other parent with the location information. That is, in order to be provided with the location information of her/his child, the other parent must separately request the location information to the LBS provider. A user of a target terminal for positioning wants his/her location information to be provided only to those who obtain his/her own permission. This can be achieved through an authentication process for privacy security. A LBS provider provides location information of a target terminal only to a person who requests the location information. Therefore, when a third party wants to know the location information of the same target terminal, he/she must separately request the location information from the person having previously requested the location information from the LBS provider.

FIG. 1 is a timing chart illustrating a conventional LBS procedure.

A client, for example, a Secure User Plane for Location (SUPL) Agent 10, requests location information to a Home SUPL Location Platform (H-SLP) 20 by transmitting a Mobile Location Protocol (MLP) Standard Location Immediate Request (SLIR) message containing its own identifier (client-id) and an identifier (ms-id) of a target terminal for positioning (Target SET) 30 to the H-SLP 20 in step S10. Using the ms-id, the H-SLP 20 determines whether the terminal 30 is roaming in step S20, and transmits a SUPL INIT message, which informs the terminal 30 of the start of the positioning, to the terminal 30 in step S30. Here, the H-SLP 20 uses a Wireless Application Protocol (WAP) Push or Short Message Service (SMS) Trigger method for transmitting the SUPL INIT message to the terminal 30. The H-SLP 20 generates a session-id so as to discern data communication with the terminal 30, and then contains the session-id in the SUPL INIT message. The H-SLP 20 also contains a parameter indicating a positioning method (posmethod) used therein and whether the H-SLP 20 is set up as one of a proxy mode and a non-proxy mode. A difference between these two modes is that the H-SLP 20 is divided into a management server and a calculation server in the proxy mode, and is integrally formed in the non-proxy mode.

While receiving the SUPL INIT message from the H-SLP 20, the terminal 30 attempts data connection to the H-SLP 20 (S40), and permits the positioning of the target terminal 30 by transmitting a location id (lid), which indicates information on a network where the terminal 30 is presently located and a positioning method of the terminal 30 (SET capability), to the H-SLP 20 in step S50. The H-SLP 20 determines the SET capability of the terminal 30 and its own pos-method. Using these methods, the H-SLP 20 transmits/receives data necessary for the positioning to/from the terminal 30 in step S60. Either the H-SLP 20 or the terminal 30 determines a final location result (pos-result). The H-SLP 20 then transmits a SUPL END message to the terminal 30 to signal the terminal 30 of the ending of the corresponding positioning session in step S70. The H-SLP 20 transmits the pos-result to the SUPL Agent 10 in step S80.

According to FIG. 1, the pos-result is provided only to the SUPL Agent 10. That is, one request for location information results in only one location information transmission. Consequently, if there are a number of requesters for location information of the same terminal, a problem occurs in that the respective requesters must separately transmit MPL SLIP messages to the H-SLP 20.

SUMMARY OF THE INVENTION

Accordingly, the present invention has been made to solve the above-mentioned problems occurring in the conventional art, and an object of the present invention is to provide a LBS system, which can provide the same location information to numerous people at a request of one person while still maintaining the privacy security for a target terminal user.

In order to accomplish this aspect of the present invention, there is provided a LBS system including a requester terminal for requesting location information of a specific terminal in order to obtain the location information of a specific terminal; a LBS provider receiving a request for the location information of the specific terminal from the requester terminal and providing the requester terminal with the location information of the specific terminal; and a mobile communication operator receiving a request message for the location information from the requester terminal to deliver the requested message to the LBS provider and receiving the location information of the specific terminal from the LBS provider to deliver the location information to the requester terminal, wherein the mobile communication operator receives information on at least one or more terminals specified to simultaneously receive the location information of the specific terminal, along with the requested message for the location information of the specific terminal, from the requester terminal, whereby the mobile communication operator delivers the location information of the specific terminal, which has been received from the LBS provider, to the at least one specified terminal along with the requester terminal.

In accordance with another aspect of the present invention, there is provided a LBS system including a requester terminal requesting location information of a specific terminal in order to obtain the location information of the specific terminal; and a LBS provider receiving a request for the location information of the specific terminal from the requester terminal and providing the requester terminal with the location information of the specific terminal, wherein the LBS provider receives information on at least one terminal specified to simultaneously receive the location information of the specific terminal, along with the request for the location information of the specific terminal, from the requests terminal, whereby the LBS provider delivers the location information of the specific terminal to the at least one specified terminal along with the requester terminal.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
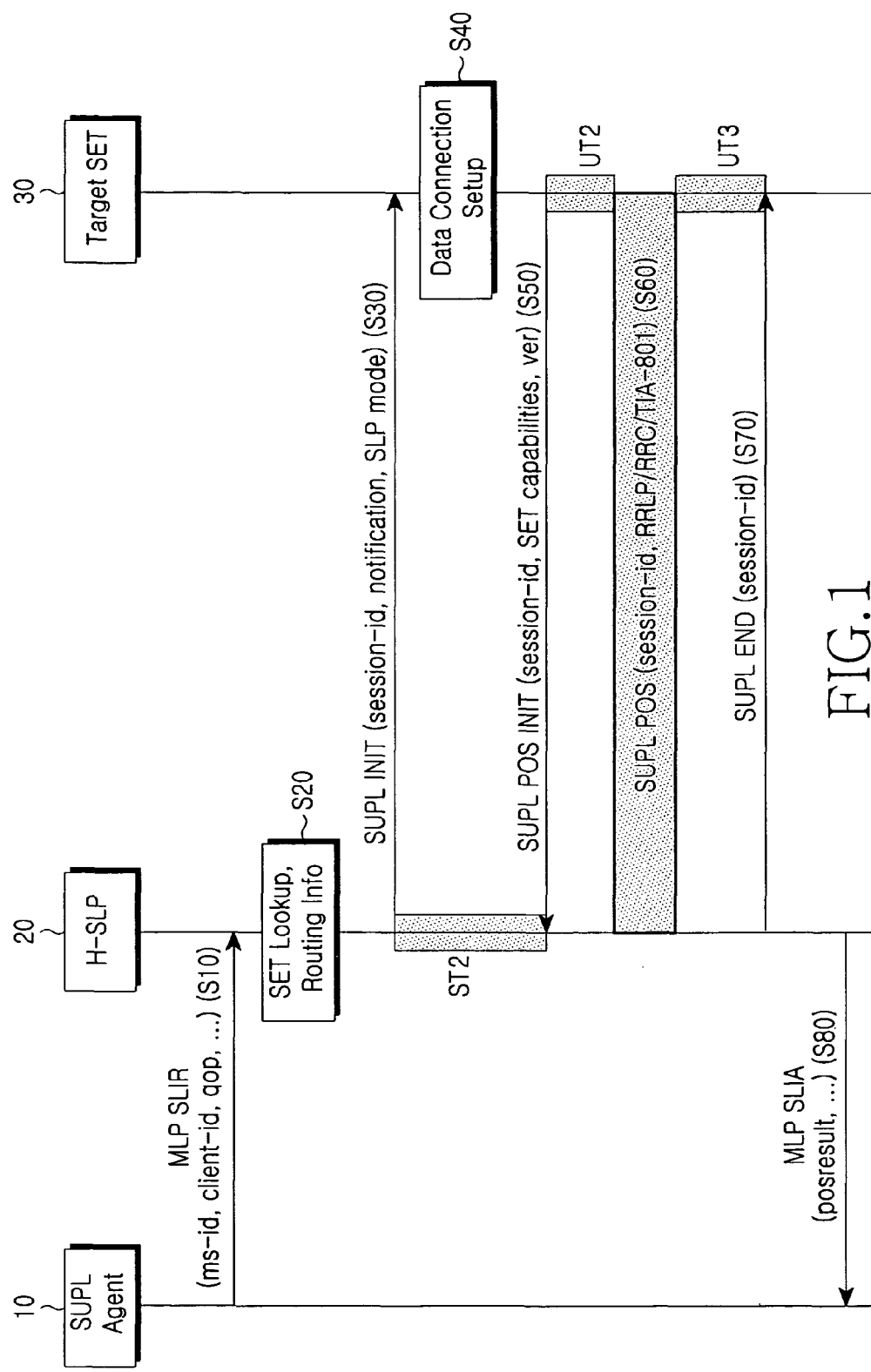
FIG. 1 is a timing chart illustrating a conventional Location Based Service (LBS) procedure.

Hereinafter, preferred embodiments of the present invention will be described with reference to the accompanying drawings. It should be noted that the similar components are designated by similar reference numerals although they are illustrated in different drawings. Also, in the following description, a detailed description of known functions and configurations incorporated herein will be omitted when it may obscure the subject matter of the present invention.

The present invention provides a Location Based Service (LBS) system which checks whether a requester for location information of a target terminal as well as a third party specified by the requester have permission to obtain the location information, and upon confirmation, then provides both the requester and the third party with the location information. In order to solve problems occurring in the conventional art, the LBS system of the present invention contains identifiers of terminals, which belong to those who are to receive location information, in a request message for the location information, and transmits the request message to a Home SUPL Location Platform (H-SLP). After positioning the target terminal, the H-SLP transmits the location information of the target terminal to a requester for the location information, and simultaneously transmits the location information to other recipients by using the identifiers of the corresponding recipients contained in the request message. That is, a request message for location information can be transmitted once, whereby a client, the party to the request for the location information, as well as a third party specified by the client can receive the location information.

A first embodiment of the present invention corresponds to a networked initiate method in which location information is requested through a Secure User Plane for Location (SUPL) Agent. In such a networked initiated method, a requester for location information of a target terminal transmits information on the target terminal for positioning (ms-id) and the identifier (e.g., phone number) of a third party, with whom the requester shares the location information of the target terminal, to a SUPL Agent (client, e.g., mobile communication operator) by using the terminal of the requester. In order to request the location information of the target terminal, the SUPL Agent transmits the identifier of the third party and its own identifier (SUPL Agent id) to a LBS provider, that is, a H-SLP. While receiving the request for the location information of the target terminal from the SUPL Agent, the LBS provider determines the location information of the target terminal, and then transmits the determined location information to the requester terminal in response to the request for the location information. Simultaneously, the LBS provider transmits the location information containing the identifier of the third party specified by the requester terminal to the SUPL Agent so as to enable a number of people to be provided with the location information only at the request of the requester terminal.

A second embodiment of the present invention corresponds to a SET initiated method in which the terminal of a requester for location information of a target terminal transmits a request message for the location information directly to a LBS provider without passing through a SUPL Agent. The request message transmitted at that time contains the identifier of the target terminal for positioning (ms-id), the identifier of the requester terminal (requester id), and the identifier of a third party terminal to be provide with the location information (third party id). Specific protocols and applications must be implemented between the requester terminal and the LBS provider in order to achieve the aspect of the present invention.

A user of the target terminal for positioning must previously store identifiers of terminals, which belong to those who are authorized to be provided with his/her location information, in a database of the LBS provider or an external database communicable with the LBS provider, for example, a privacy profile register. Before transmitting a determined location information to the requester for the location information and the third party specified by the requester, the LBS provider checks whether they have permission to obtain the location information. Therefore, it is necessary for the user of the target terminal to previously store a list of terminals having permission to obtain his/her location information, in a specific database. Consequently, the LBS provider can directly confirm whether it has authority to provide the location information to persons who are to obtain the location information in such a manner that it transmits the identifiers of terminals, which belong to the corresponding persons, to the target terminal just before transmitting the location information. In this case, the target terminal can give or refuse the LBS provider permission to transmit its own location information.

Figure 2:
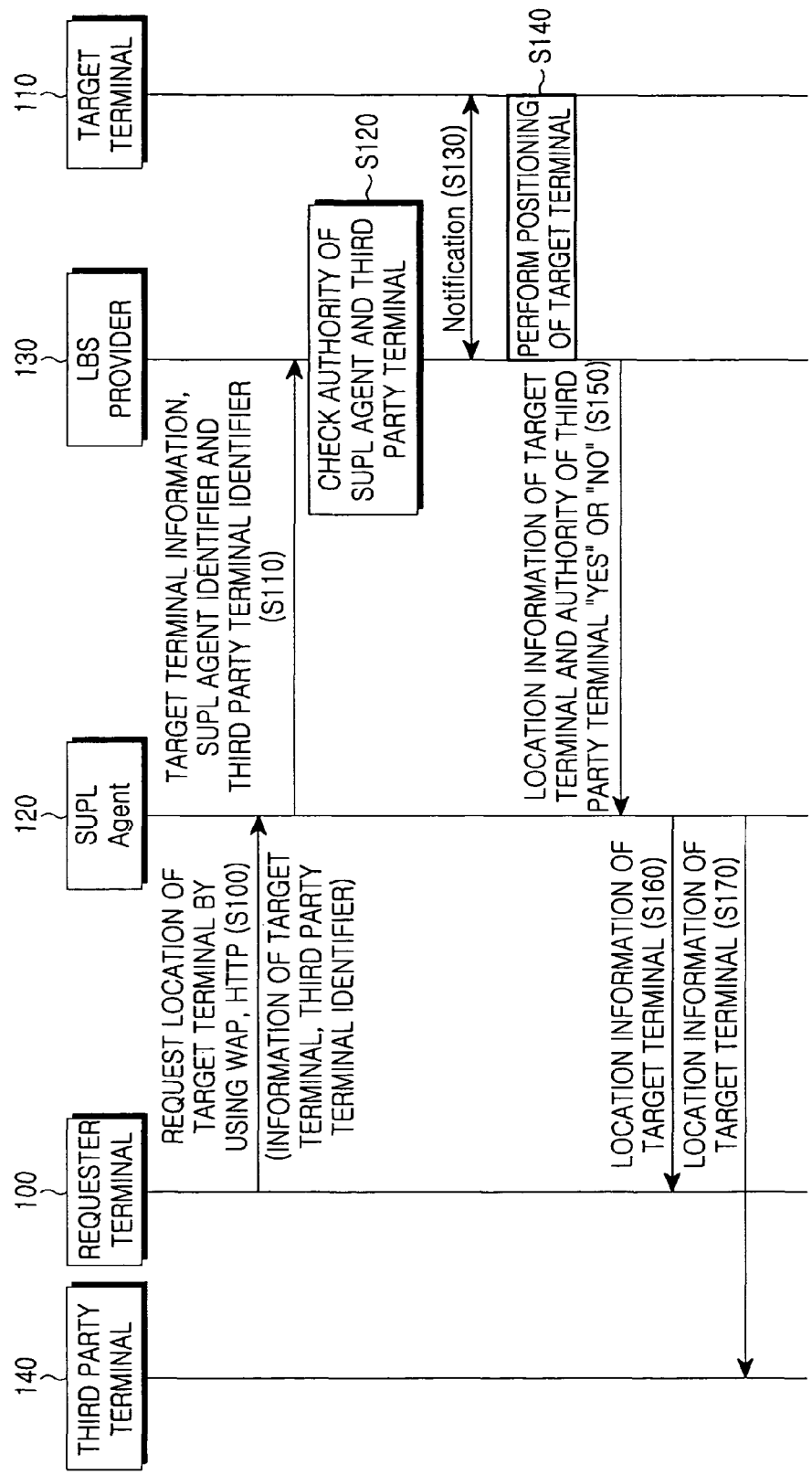
FIG. 2 is a timing chart illustrating a procedure in which a requester terminal and a third party terminal are simultaneously provided with location information of a target terminal in accordance with the present invention.

FIG. 2 is a timing chart illustrating a procedure in which a requester terminal and a third party terminal are simultaneously provided with location information of a target terminal in accordance with the present invention.

Figure 3:
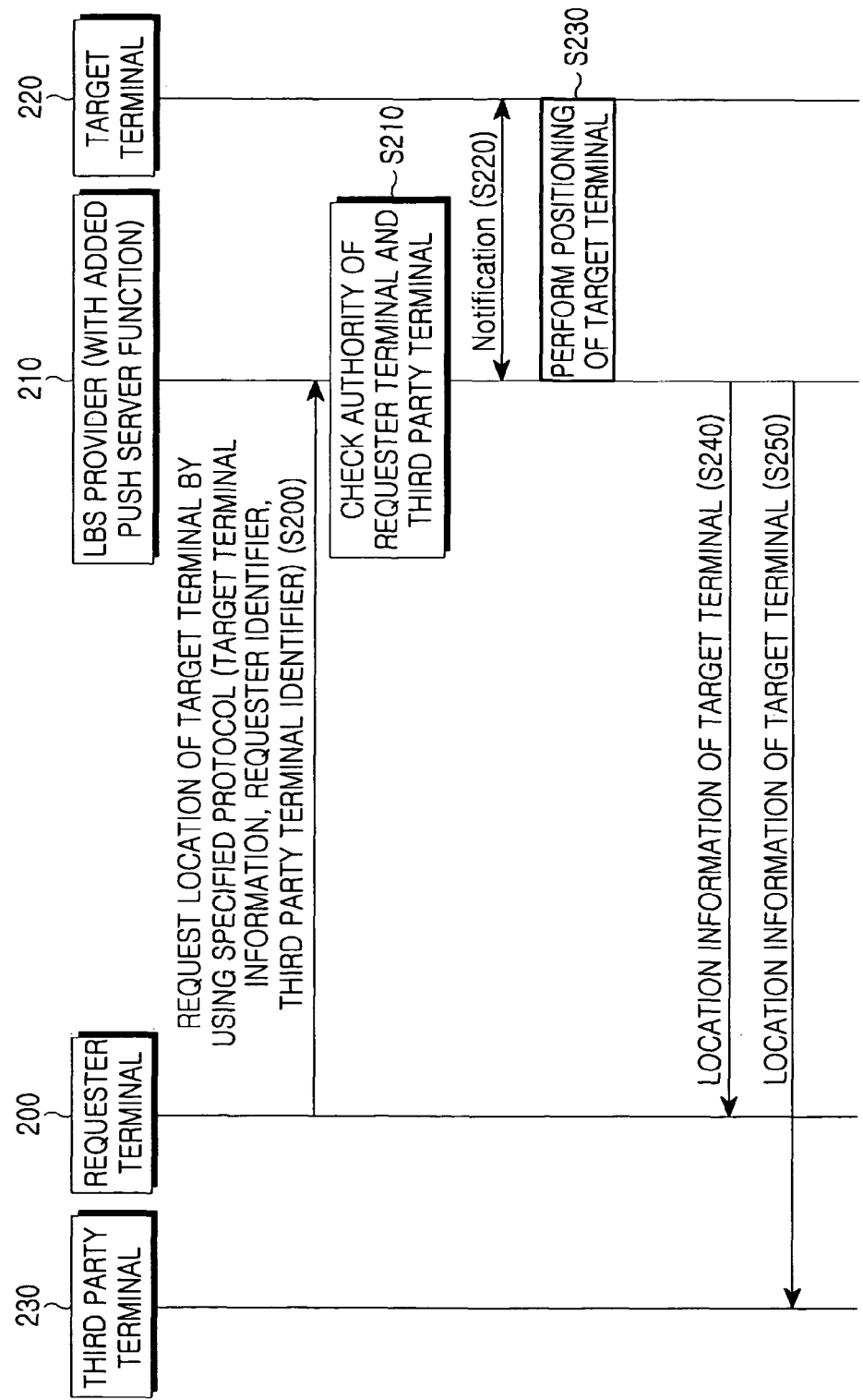
FIG. 3 is a timing chart illustrating a procedure in which a requester terminal and a third party terminal are simultaneously provided with location information of a target terminal in accordance with the present invention.

Referring to FIGS. 2 and 3, a description of a requester terminal, a SUPL Agent and a LBS provider is given below. The requester terminal refers to a terminal of a user who requests a LBS, and the user of the LBS transmits the identifier of a third party who can obtain location information of a target terminal, along with information on the target terminal, to the LBS provider. The SUPL Agent refers to an operator who provides a mobile communication service while residing in a home network of the request terminal, and is operative to determine whether the requester terminal is qualified for using the mobile communication service and to provide the location information to the requester terminal. The LBS provider refers to a provider to which the user of the requester terminal requests positioning of the target terminal, and checks if the requester terminal has permission to obtain the location information of the target terminal. The LBS provider also checks if a third party terminal has permission to obtain the location information of the target terminal. The LBS provider can check for permission of the requester terminal and the third party terminal to obtain the location information of the target terminal by transmitting a message to the target terminal. Depending on the result, the LBS provider transmits or does not transmit the location information of the target terminal to the requester terminal or the third party terminal.

The requester terminal 100 requests location information of the target terminal 110 to a SUPL Agent 120 by using a Wireless Application Protocol (WAP) or Hyper Text Transfer Protocol (HTTP) in order to transmit information on the target terminal 110 and the identifier of the third party terminal 140 in step S100. The SUPL Agent 120 requests the location information of the target terminal 110 to a LBS provider 130 by transmitting the information on the target terminal 110, the identifier of the SUPL Agent 120, and the identifier of the third party terminal 140 to the LBS provider 130 in step S110. Using the identifiers of the SUPL Agent 120 and the third party terminal 140, the LBS provider 130 checks if the SUPL Agent 120 has authority to request the location information, and if the third party terminal 140 has permission to obtain the location information of the target terminal 110, respectively in step S120. Here, the LBS provider 130 performs the authority check based on whether the identifiers of the SUPL Agent 120 and the third party terminal 140 coincide with those stored in its own database or an external database communicable therewith. A user of the target terminal 110 previously stores identifiers of terminals, which belong to those who have permission to obtain the location information of the target terminal 110, in the database of the LBS provider 130 or the external database communicable with the LBS provider 130.

The LBS provider 130 transmits a Notification parameter, which contains the identifiers of the requester terminal 100 and the third party terminal 140, to the target terminal 110 in step S130. Such a Notification parameter also indicates a result of the authority check carried out for the requester terminal 100 and the third party terminal 140 in step S110.

The user of the target terminal 110 confirms the contents of the Notification parameter, and thereby can determine whether to grant permission to the LBS provider 130 to perform positioning of the target terminal 110. If the user of the target terminal 110 denies permission, the target terminal 110 transmits a denial result to the LBS provider 130, and accordingly the LBS provider 130 does not perform the positioning of the target terminal 110. The denial result is transmitted in sequence to the SUPL Agent 120 and the requester terminal 100.

If the user of the target terminal 110 grants permission, the LBS provider 130 performs the positioning of the target terminal 110 while communicating with the target terminal 110 in step S140. Here, a cell-based method or a Global Positioning System (GPS) can be used for the positioning. The LBS provider 130 transmits location information of the target terminal 110, which is determined by the positioning, and an indication of the permission of the third party terminal for the location information to the SUPL Agent 120 in step S150.

The SUPL Agent 120 transmits the location information of the target terminal 110 to the requester terminal 100 in step S160. Through the indication received from the LBS provider 130, the SUPL Agent 120 also confirms whether the third party terminal 140 has permission to obtain the location information of the target terminal 110. If a result of the confirmation shows that the third party terminal 140 has permission, the SUPL Agent 120 transmits the location information in a Push message or a Short Message Service (SMS) message format to the third party terminal 140 in step S170. Here, when the identifier of the third party terminal 140 transmitted from the requester terminal 100 in step S100 is a phone number, the SUPL Agent 120 transmits the location information through the phone number.

According to the procedure in FIG. 2, the SUPL Agent 120 serves to deliver the location information between the requester terminal 100, a requester for the location information, and the LBS provider 130. In contrast with this, there is another method in which the requester terminal communicates directly with the LBS provider. This corresponds to the above-mentioned second embodiment of the present invention.

Reference will now be made to the second embodiment with reference to FIG. 3. FIG. 3 is a timing chart illustrating a procedure in which a requester terminal and a third party terminal are simultaneously provided with location information of a target terminal in accordance with the second embodiment of the present invention.

In the second embodiment, the requester terminal 200 and a LBS provider 210 must have a specific protocol by which they can communicate with each other. Since a terminal can have access to an IP network through a user plane in a mobile communication system, the requester terminal 200 and the LBS provider 210 can communicate with each other through the IP network. The requester terminal 200 transmits the identifiers of the requester terminal 200 and the third party terminal 230, which can indicate whether these terminals have authority to request the location information, to the LBS provider 210. The LBS provider 210 checks if the requester terminal 200 and the third party terminal 230 have permission to obtain the location information. The LBS provider 210 performs positioning of the target terminal 220, and transmits the location information determined by the positioning to the requester terminal 200. Here, since the LBS provider 210 is in session with the requester terminal 200, it can transmit the location information directly to the requester terminal 200 by using the current open session.

In the case of the third party terminal 230, if the identifier of the third party terminal 230 is in the form of a phone number or information enabling the LBS provider 210 to find out a destination, the LBS provider 210 transmits the location information in a Push message or SMS message format. Thus, the LBS provider 210 is implemented with a WAP Push function and a SMS message transmission function. The requester terminal 200 requesting the location information provides information on the target terminal 220, its own identifier, and the identifier of the third party terminal 230 that is to be simultaneously provided with the location information, to the LBS provider 210.

Referring to FIG. 3, the requester terminal 200 transmits a request message for the location information of the target terminal 220 to the LBS provider 210 by using a specified protocol in step S200. Here, information on the target terminal 220 (ms-id), the identifier of the requester terminal 200 (requester-id), and the identifier of the third party terminal 230 are contained in the request message. Using the identifiers of the requester terminal 200 and the third party terminal 230 (e.g., there can be at least one third party terminal), the LBS provider 210 check if the terminals have authority to request the location information in step S210. To this end, a user of the target terminal 220 previously stores a list of terminals, that is, identifiers of terminals, which can request the location information of the target terminal's own, in a database of the LBS provider 210.

The LBS provider 210 transmits a Notification parameter, which contains the identifiers of the requester terminal 200 and the third party terminal 230, to the target terminal 220 in step S220. Such a Notification parameter also indicates a result of the authority check executed for the requester terminal 200 and the third party terminal 230 in step S210.

The user of the target terminal 220 confirms the contents of the Notification parameter, and thereby can determine whether to grant permission to the LBS provider 210 to perform positioning of the target terminal 220. If the user of the target terminal 220 denies permission, the target terminal 220 transmits a denial result to the LBS provider 210, and accordingly the LBS provider 210 does not perform the positioning of the target terminal 220. The denial result is transmitted to the requester terminal 200.

If the user of the target terminal 220 grants permission, the LBS provider 210 performs the positioning of the target terminal 220 in step S230. Upon completion of the positioning, the LBS provider 210 transmits the location information of the target terminal 220 to the requester terminal 200 in step S240. If the third party terminal 230 has permission to obtain the location information, the LBS provider also transmits the location information in a Push or SMS message format to the third party terminal 230 in step S250.

According to the present invention as described above, both a requester for location information and a third party specified by the requester can be provided with the location information if only one request message for the location information is transmitted. That is, if one of users desiring to be informed of location information of a target terminal for positioning requests the location information, the other user is also simultaneously provided with the location information. For example, if parents want to know the location of their child, the father can also be provided with the location information at the mother's request.

Although preferred embodiments of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for providing a Location Based Service (LBS) by an LBS provider, the method comprising:
    receiving identifiers of terminals, which belong to those who are authorized to be provided with location information of a specific terminal, from a user of the specific terminal and storing the identifiers in the LBS provider;
    receiving a request message for location information of the specific terminal from a requester terminal, wherein the request message contains information on the specific terminal and identifiers of the requester terminal and at least one terminal specified to simultaneously receive the location information of the specific terminal;
    performing positioning of the specific terminal to obtain the location information of the specific terminal when the request message is received;
    determining whether the requester terminal and the at least one specified terminal have permission to obtain the location information based on whether the identifiers of the requester terminal and the at least one specified terminal is included in the stored identifiers of terminals; and
    delivering the current location information of the specific terminal to the at least one specified terminal along with the requester terminal when permission to obtain the current location information is granted.

2. The method as claimed in claim 1, wherein
    the LBS provider receives the request message from requester terminal through a mobile communication operator and delivers the location information of the specific terminal to the at least one specified terminal along with the requester terminal through the mobile communication operator.

3. The method as claimed in claim 2, wherein the at least one terminal specified to simultaneously receive the location information of the specific terminal is provided with different mobile communication services, and the mobile communication operator is connected to mobile communication systems supporting the different mobile communication services.

4. The method as claimed in claim 2, wherein the requester terminal transmits the request message to the mobile communication operator by using a one of Wireless Application Protocol (WAP) and Hypertext Transfer Protocol (HTTP).

5. The method as claimed in claim 2, wherein the mobile communication operator transmits an identifier of the mobile communication operator, along with information contained in the request message, to the LBS provider.

6. The method as claimed in claim 5, further comprising checking if the mobile communication operator, the requester terminal, and the at least one terminal specified to simultaneously receive the location information of the specific terminal have permission to obtain the location information of the specific terminal, by means of the identifiers thereof.

7. The method as claimed in claim 6, wherein the LBS provider checks the authority for the location information of the specific terminal based on whether the identifiers of the mobile communication operator, the requester terminal, and the at least one terminal specified to simultaneously receive the location information of the specific terminal coincide with those stored in a database of the LBS provider.

8. The method as claimed in claim 6, further comprising delivering the location information of the specific terminal determined by the positioning and a result of checking if the at least one terminal specified to simultaneously receive the location information of the specific terminal has the permission to obtain for the location information to the mobile communication operator, wherein the mobile communication operator transmits the location of the specific terminal to the at least one terminal specified to simultaneously receive the location information of the specific terminal according to whether it has authority for the location information.

9. The method as claimed in claim 8, wherein, if the identifiers of the at least one terminal specified to simultaneously receive the location information of the specific terminal are phone numbers, the mobile communication operator transmits the location information of the specific terminal to the terminals having the phone numbers.

10. The method as claimed in claim 9, wherein the mobile communication operator transmits the location information of the specific terminal in one of a Push message format and a SMS message format to the at least one terminal specified to simultaneously receive the location information of the specific terminal.

11. The method as claimed in claim 5, further comprising delivering the identifiers of the mobile communication operator, the requester terminal, and the at least one terminal specified to simultaneously receive the location information of the specific terminal to the specific terminal, wherein the LBS provider performs positioning of the specific terminal according to whether the specific terminal grants the LBS provider permission to perform the positioning.

12. The method as claimed in claim 1, wherein the LBS provider performs positioning of the specific terminal by means of one of a cell-based method and a Global Positioning System (GPS).

13. A method for receiving a Location Based Service (LBS) by a requester terminal, the method comprising:
    transmitting identifiers of terminals, which belong to those who are authorized to be provided with location information of a specific terminal, for storing the identifiers in an LBS provider;
    transmitting a request message for location information of the specific terminal to an LBS provider, wherein the request message contains information on the specific terminal and identifiers of the requester terminal and at least one terminal specified to simultaneously receive the location information of the specific terminal; and receiving the location information of the specific terminal from the LBS provider along with the at least one specified terminal when the requester terminal and the at least one specified terminal have been granted permission to obtain the location information based on whether the identifiers of the requester terminal and the at least one specified terminal is included in the stored identifiers of terminals.

14. The method as claimed in claim 13, wherein the at least one terminal specified to simultaneously receive the location information of the specific terminal is provided with different mobile communication services.

15. The method as claimed in claim 14, wherein the LBS provider is connected to mobile communication systems supporting the different mobile communication services.

16. The method as claimed in claim 13, wherein the LBS provider and the requester terminal are connected to each other through a specific protocol.

17. The method as claimed in claim 16, wherein the LBS provider and the requester terminal are connected to each other through an Internet Protocol (IP).

18. The method as claimed in claim 13, wherein the LBS provider checks if the requester terminal and the at least one terminal specified to simultaneously receive the location information of the specific terminal have authority to request the location information of the specific terminal, by means of the identifiers thereof, and accordingly performs positioning of the specific terminal.

19. The method as claimed in claim 18, wherein the LBS provider checks the authority for the location information of the specific terminal based on whether the identifiers of the requester terminal and the at least one terminal specified to simultaneously receive the location information of the specific terminal coincide with those stored in a database of the LBS provider.

20. The method as claimed in claim 18, wherein, if the at least one terminal specified to simultaneously receive the location information of the specific terminal have permission to obtain the location information of the specific terminal, the LBS provider transmits the location information of the specific terminal determined by the positioning to the at least one terminal specified to simultaneously receive the location information of the specific terminal.

21. The method as claimed in claim 20, wherein, if the identifiers of the at least one terminal specified to simultaneously receive the location information of the specific terminal are phone numbers, the LBS provider transmits the location information of the specific terminal in one of a Push message format and a Short Message Service (SMS) message format to the at least one terminal specified to simultaneously receive the location information of the specific terminal.

22. The method as claimed in claim 13, wherein the identifiers of the requester terminal and the at least one terminal specified to simultaneously receive the location information of the specific terminal are delivered to the specific terminal by the LBS provider, and the LBS provider performs positioning of the specific terminal according to whether the specific terminal give the LBS provider permission to perform the positioning.

23. A method for providing a Location Based Service (LBS) by an LBS provider, the method comprising the steps of:

receiving identifiers of terminals, which belong to those who are authorized to be provided with location information of a specific terminal, from a user of the specific terminal and storing the identifiers in the LBS provider;

receiving a request message for location information of the specific terminal from a requester terminal, wherein the request message contains information on the specific terminal and an identifier of the requester terminal;

performing positioning of the specific terminal to obtain the location information of the specific terminal when the request message is received;

checking if there is at least one terminal specified by the requester terminal, wherein an identifier of the at least one terminal specified by the requester terminal is contained in the request message;

determining whether the requester terminal and the at least one terminal have permission to obtain the location information based on whether the identifiers of the requester terminal and the at least one terminal are included in the stored identifiers of terminals; and simultaneously delivering the location information of the specific terminal to the at least one terminal along with the requester terminal when permission to obtain the location information is granted.

\* \* \* \* \*